United States Patent
Kado et al.

(10) Patent No.: US 10,965,180 B2
(45) Date of Patent: Mar. 30, 2021

(54) ROTARY ACTUATOR

(71) Applicant: DENSO CORPORATION, Kariya (JP)

(72) Inventors: Hiroyuki Kado, Kariya (JP); Taku Ito, Kariya (JP)

(73) Assignee: DENSO CORPORATION, Kariya (JP)

( * ) Notice: Subject to any disclaimer, the term of this patent is extended or adjusted under 35 U.S.C. 154(b) by 134 days.

(21) Appl. No.: 16/390,273

(22) Filed: Apr. 22, 2019

(65) Prior Publication Data

US 2019/0245407 A1    Aug. 8, 2019

Related U.S. Application Data

(63) Continuation of application No. PCT/JP2017/040738, filed on Nov. 13, 2017.

(30) Foreign Application Priority Data

Nov. 15, 2016  (JP) .............................. JP2016-222161

(51) Int. Cl.
| | |
|---|---|
| *H02K 5/10* | (2006.01) |
| *F16H 61/32* | (2006.01) |
| *F16J 15/447* | (2006.01) |
| *H02K 7/116* | (2006.01) |
| *H02K 5/22* | (2006.01) |
| *H02K 7/14* | (2006.01) |

(52) U.S. Cl.
CPC .............. *H02K 5/10* (2013.01); *F16H 61/32* (2013.01); *F16J 15/4476* (2013.01); *H02K 5/225* (2013.01); *H02K 7/116* (2013.01); *H02K 7/14* (2013.01); *F16H 2061/326* (2013.01); *H02K 2205/09* (2013.01); *H02K 2213/03* (2013.01)

(58) Field of Classification Search
CPC .. H02K 5/00; H02K 5/10; H02K 5/12; H02K 5/124; H02K 5/22; H02K 5/225; H02K 7/00; H02K 7/003; H02K 7/08; H02K 7/083; H02K 7/11; H02K 7/116; H02K 7/14; F16J 15/32; F16J 15/323; F16J 15/3236; F16J 15/44; F16J 15/447; F16J 15/4476; F16H 61/32
See application file for complete search history.

(56) References Cited

U.S. PATENT DOCUMENTS

| | | | | |
|---|---|---|---|---|
| 2004/0247437 A1* | 12/2004 | Otaki | ...................... | F16H 13/14 416/132 B |
| 2009/0189468 A1* | 7/2009 | Kume | .................... | H02K 1/148 310/83 |
| 2011/0006485 A1* | 1/2011 | Nakagawa | ........... | F16J 15/3264 277/549 |

(Continued)

FOREIGN PATENT DOCUMENTS

| | | |
|---|---|---|
| JP | 55-152963 | 11/1980 |
| JP | 2005-45968 | 2/2005 |

*Primary Examiner* — Tran N Nguyen
(74) *Attorney, Agent, or Firm* — Nixon & Vanderhye PC

(57) ABSTRACT

A rotary actuator includes: an electric motor; a case that receives the electric motor; a rotatable body that is configured to transmit an output of the electric motor to an outside of the case; a seal member that seals between the rotatable body and the case; and a labyrinth forming portion that forms a labyrinth space in a path that extends from an outside space of the case to a sealing point of the rotatable body, at which the rotatable body is sealed by the seal member.

11 Claims, 16 Drawing Sheets

(56) References Cited

U.S. PATENT DOCUMENTS

2013/0313949 A1 11/2013 Fujii
2016/0131150 A1* 5/2016 Oda .................. F16J 15/44
　　　　　　　　　　　　　　　　　　　　　415/230

* cited by examiner

ONE CIRCUMFERENTIAL DIRECTION ←→ OTHER CIRCUMFERENTIAL DIRECTION

US 10,965,180 B2

ROTARY ACTUATOR

CROSS REFERENCE TO RELATED APPLICATIONS

This application is a continuation application of International Patent Application No. PCT/JP2017/040738 filed on Nov. 13, 2017, which designated the U.S. and claims the benefit of priority from Japanese Patent Application No. 2016-222161 filed on Nov. 15, 2016. The entire disclosures of all of the above applications are incorporated herein by reference.

TECHNICAL FIELD

The present disclosure relates to a rotary actuator.

BACKGROUND

Previously, there is known a rotary actuator that is used as a drive device of a shift-by-wire system of a vehicle. At the rotary actuator, an electric motor is received in a case, and a manual shaft of a transmission is fitted to an output shaft of the rotary actuator.

SUMMARY

According to the present disclosure, a rotary actuator includes an electric motor; a case that receives the electric motor; a rotatable body that is configured to transmit an output of the electric motor to an outside of the case; a seal member that seals between the rotatable body and the case; and a labyrinth forming portion that forms a labyrinth space in a path that extends from an outside space of the case to a sealing point of the rotatable body, at which the rotatable body is sealed by the seal member.

BRIEF DESCRIPTION OF DRAWINGS

The present disclosure, together with additional objectives, features and advantages thereof, will be best understood from the following description in view of the accompanying drawings.

DETAILED DESCRIPTION

Previously, there has been proposed a rotary actuator that is used as a drive device of a shift-by-wire system of a vehicle. At the rotary actuator, an electric motor is received in a case, and a manual shaft of a transmission is fitted to an output shaft of the rotary actuator. The output shaft and the manual shaft form a rotatable body, and a seal member is placed between the case and the rotatable body. The seal member limits intrusion of liquid, such as water, or a foreign object from an outside space into an inside of the case.

At the rotary actuator, corrosion may possibly occur at an exposed portion of the rotatable body that is located on the outside space side of a sealing point, at which the rotatable body is sealed by the seal member. Thereby, a gap may be formed between the rotatable body and the seal member upon elapse of time, and the water or a foreign object may possibly intrude into an area of the electric motor at the inside of the case.

A rotary actuator of the present disclosure includes an electric motor; a case that receives the electric motor; a rotatable body that is configured to transmit an output of the electric motor to an outside of the case; a seal member that seals between the rotatable body and the case; and a labyrinth forming portion that forms a labyrinth space in a path that extends from an outside space of the case to a sealing point of the rotatable body, at which the rotatable body is sealed by the seal member.

By providing the labyrinth space in the path, which extends from the outside space to the sealing point, application of water to the sealing point and its peripheral area is reduced. Therefore, the gap is less likely formed between the rotatable body and the seal member upon elapse of time, and thereby intrusion of the water or the foreign object into the inside of the case can be limited.

Hereinafter, embodiments will be described with reference to the drawings. Substantially identical features among the embodiments are indicated by the same reference signs and will not be described redundantly.

First Embodiment

Figure 1:
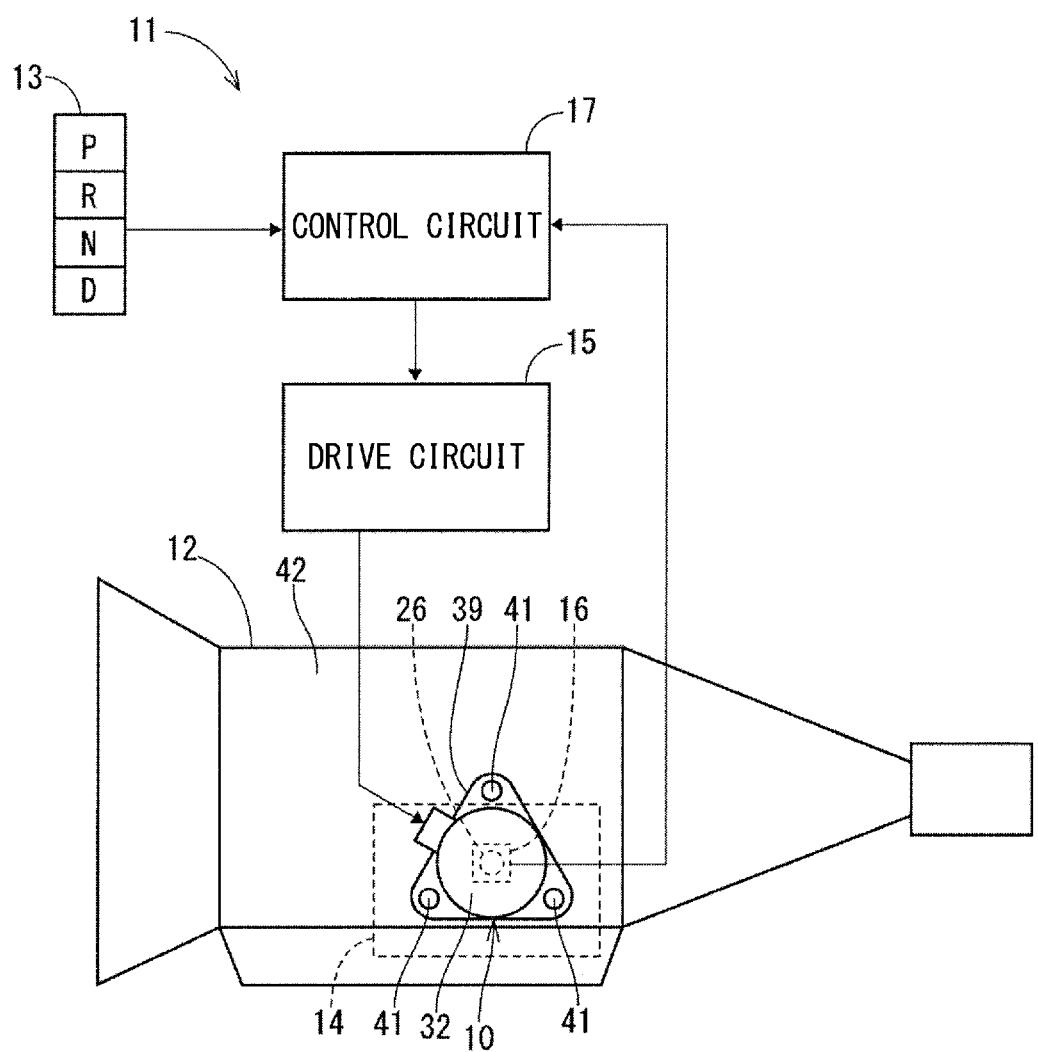
FIG. 1 is a schematic diagram showing a shift-by-wire system, in which a rotary actuator of a first embodiment is applied.

FIG. 1 shows a rotary actuator (hereinafter referred to as an actuator) according to a first embodiment. The actuator 10 is used as a drive device of a shift-by-wire system 11 of a vehicle.

(Structure of Shift-by-Wire System)

First of all, a structure of the shift-by-wire system 11 will be described with reference to FIG. 1. The shift-by-wire system 11 includes: a shift manipulator 13 that is configured to command a shift range of a transmission 12 of the vehicle; an actuator 10 that is configured to drive a shift range change mechanism 14 of the transmission 12; a drive circuit 15 of the actuator 10; an inhibitor switch 16 that is configured to sense a rotational position of a manual shaft 26, which is rotated integrally with an output shaft of the actuator 10; and a control circuit 17. The control circuit 17 controls the drive circuit 15 according to a command signal of the shift range and thereby drives the actuator 10.

Figure 2:
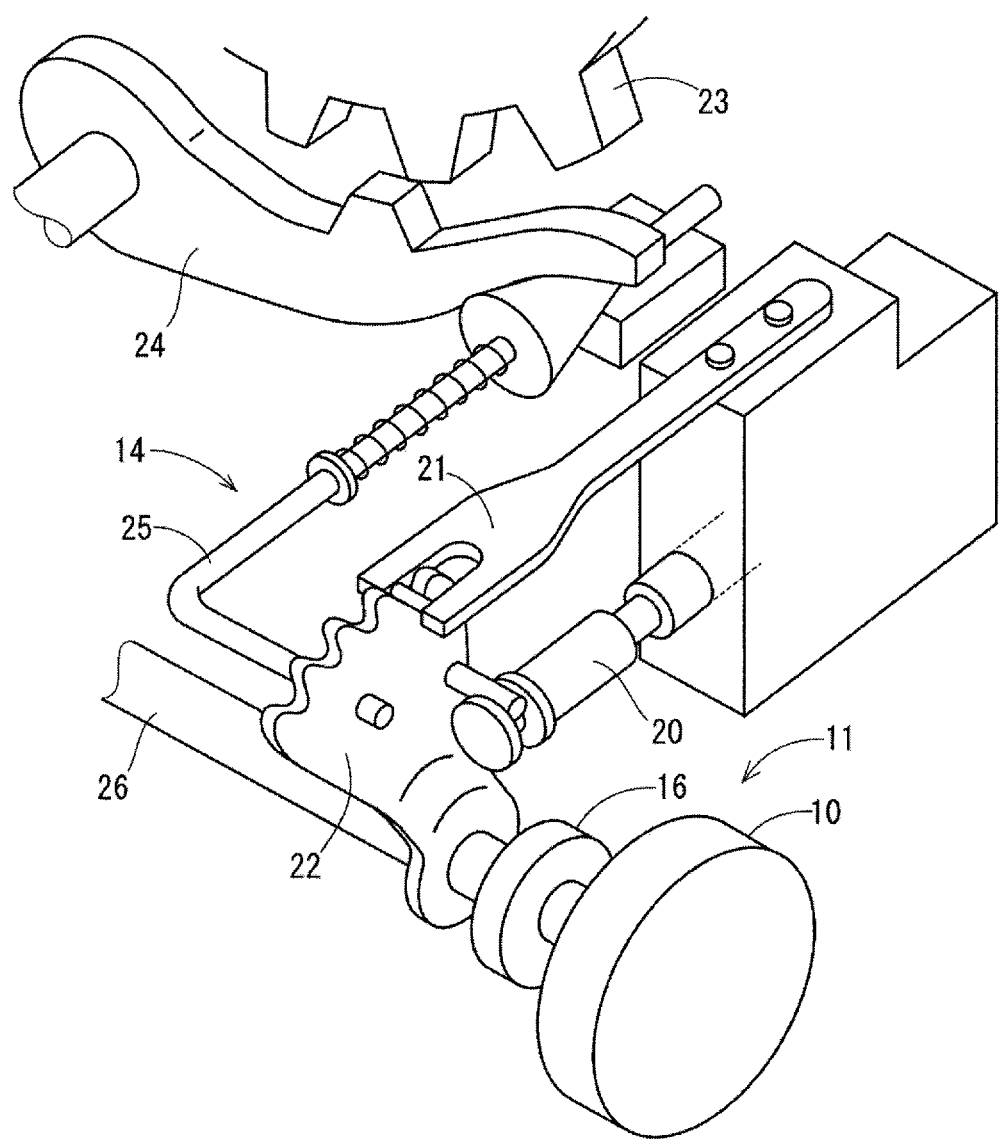
FIG. 2 is a descriptive diagram for describing a shift range change mechanism shown in FIG. 1.

As shown in FIG. 2, the shift range change mechanism 14 includes: a range change valve 20 that is configured to control supply of a hydraulic pressure to a hydraulic operating mechanism placed in the transmission 12; a detent spring 21 and a detent lever 22 that are configured to hold the current shift range; a park rod 25 that is configured to lock rotation of the output shaft of the transmission 12 by fitting a park pole 24 to a park gear 23 of the output shaft at the time of shifting the shift range to a parking range; and a manual shaft 26 that is configured to rotate integrally with the detent lever 22.

The shift range change mechanism 14 rotates the detent lever 22 together with the manual shaft 26 to place each of the range change valve 20 and the park rod 25, which are coupled to the detent lever 22, to a corresponding position that corresponds to a target shift range. The shift-by-wire system 11 includes an actuator 10 that is directly coupled to the manual shaft 26 to electrically change the shift range.

(Structure of Actuator)

Figure 3:
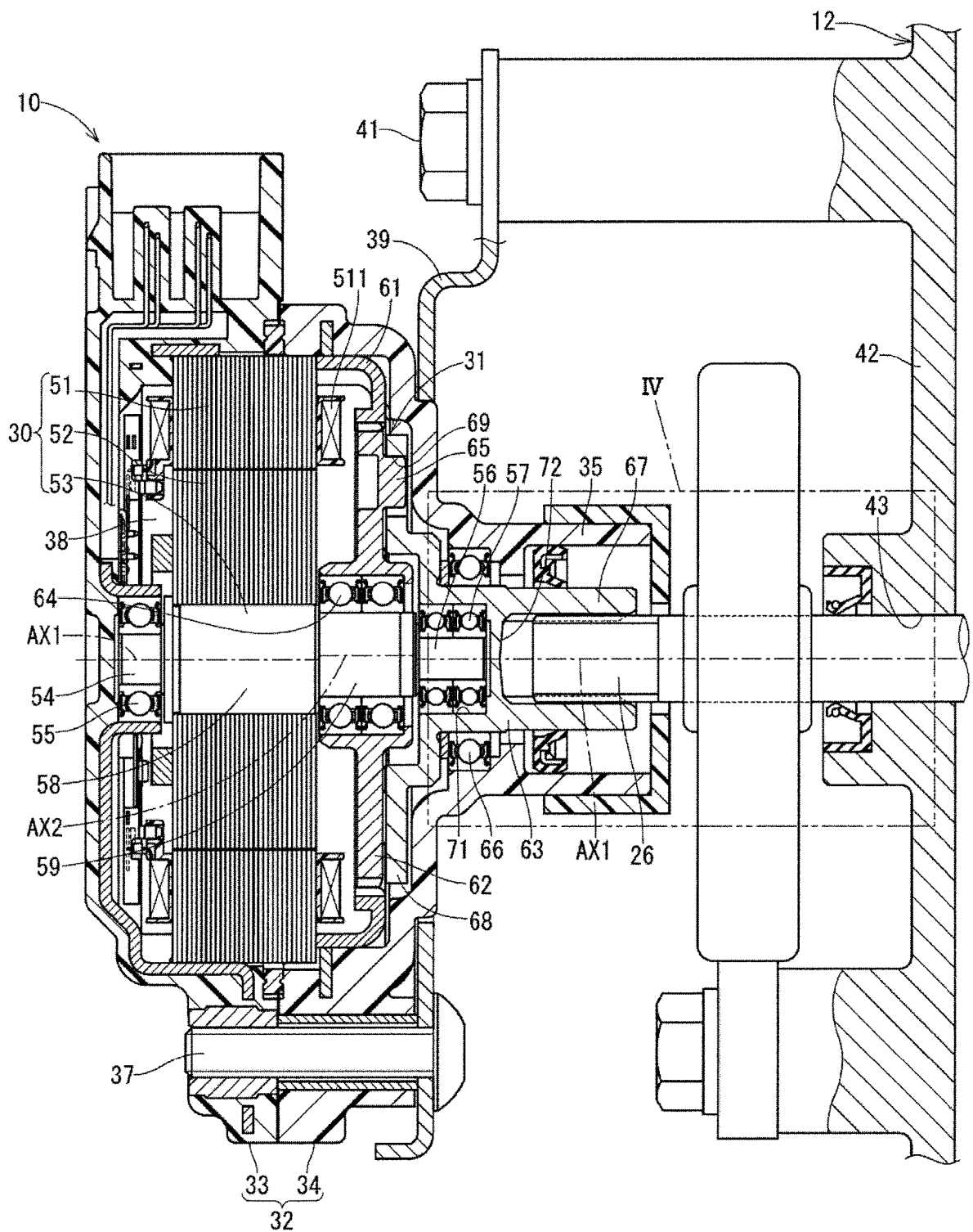
FIG. 3 is a cross sectional view of the rotary actuator shown in FIG. 1.

Next, a structure of the actuator 10 will be described with reference to FIGS. 1 and 3. The actuator 10 includes: an electric motor 30 that serves as a drive source; a speed reducing mechanism 31 that is configured to transmit a rotational drive force of the electric motor 30 to the shift range change mechanism 14; and a case 32 that receives the electric motor 30 and the speed reducing mechanism 31.

The case 32 includes a first case portion 33 and a second case portion 34, which are respectively shaped into a cup form. The first case portion 33 and the second case portion 34 are fixed together by bolts 37 and define a receiving space 38 that receives the electric motor 30 and the speed reducing mechanism 31.

A bracket 39 is provided to an opposite side of the second case portion 34, which is opposite from the first case portion 33, while the bracket 39 is fixed to the second case portion 34 by the bolts 37. The actuator 10 is fixed to a transmission case 42 by bolts 41 that are inserted through the bracket 39.

The second case portion 34 includes a tubular projecting portion 35 that projects from a bottom part of the second case portion 34 in an axial direction. The manual shaft 26 projects into an inside of the tubular projecting portion 35 through a through hole 43 of the transmission case 42.

The electric motor 30 includes: a stator 51 that is fixed to the first case portion 33; a rotor 52 that is placed on a radially inner side of the stator 51; and a rotatable shaft 53 that is rotated together with the rotor 52 about a rotation axis AX1.

One end portion 54 of the rotatable shaft 53 is supported by a bearing 55, and the other end portion 56 of the rotatable shaft 53 is supported by a bearing 57. The bearing 55 is provided at a center of a bottom part of the first case portion 33. The bearing 57 is provided at an inside of an output shaft 63 described later.

A rotor fitting portion 58, to which the rotor 52 is fitted, and an eccentric portion 59, which is eccentric to the rotation axis AX1, are provided between the one end portion 54 and the other end portion 56. The one end portion 54, the other end portion 56, the rotor fitting portion 58 and the eccentric portion 59 are formed integrally in one piece by a common member.

The control circuit 17 controls an electric current supplied to three-phase windings 511 of the stator 51, so that the electric motor 30 can be rotated in both of two opposite directions and can be stopped at a desirable position.

The speed reducing mechanism 31 includes an internal gear 61, a planetary gear 62 and the output shaft 63. The internal gear 61 is coaxial with the rotational axis AX1 and is fixed to the second case portion 34. The planetary gear 62 is supported by a bearing 64 in a manner that enables rotation of the planetary gear 62 about the eccentric axis AX2 while the planetary gear 62 is meshed with the internal gear 61 at an inside of the internal gear 61. The bearing 64 is provided on an outer side of the eccentric portion 59. When the rotatable shaft 53 is rotated, the planetary gear 62 has a planetary motion, i.e., the planetary gear 62 revolves around the rotation axis AX1 and rotates about the eccentric axis AX2. At this time, the rotational speed of the planetary gear 62 is reduced in comparison to a rotational speed of the rotatable shaft 53. The planetary gear 62 includes a plurality of engaging projections 65 that are provided to transmit the rotation and project in the axial direction.

The output shaft 63 is coaxial with the rotational axis AX1 and includes a shaft portion 67, which is supported by a bearing 66 in a manner that enables rotation of the shaft portion 67 about the rotation axis AX1; and a flange 68 that outwardly projects from the shaft portion 67. The bearing 66 is placed at an inside of a base end part of the tubular projecting portion 35. The flange 68 includes a plurality of engaging holes 69 that are provided to transmit the rotation and respectively receive the engaging projections 65 of the planetary gear 62. The rotation of the planetary gear 62 is transmitted to the output shaft 63 through the engagement between the engaging projections 65 and the engaging holes 69.

A blind hole 71 is formed at one end portion of the shaft portion 67, which is located on the electric motor 30 side. The bearing 57 is provided in the blind hole 71. A fitting hole 72, which is a blind hole, is formed at the other end portion of the shaft portion 67 located on the transmission case 42 side. The fitting hole 72 is a spline hole. An end portion of the manual shaft 26, which is located on the actuator 10 side, is formed as a spline shaft and is inserted into the fitting hole 72, so that the manual shaft 26 is coupled to the output shaft 63 in a manner that enables transmission of the rotation between the output shaft 63 and the manual shaft 26. The output shaft 63 and the manual shaft 26 serve as a rotatable body that is configured to transmit an output of the electric motor 30 to an outside of the case 32. A seal member 73 is provided between the shaft portion 67 of the output shaft 63 and the tubular projecting portion 35. The seal member 73 seals between the rotatable body discussed above and the case 32.

(Structure Around Output Shaft)

Figure 4:
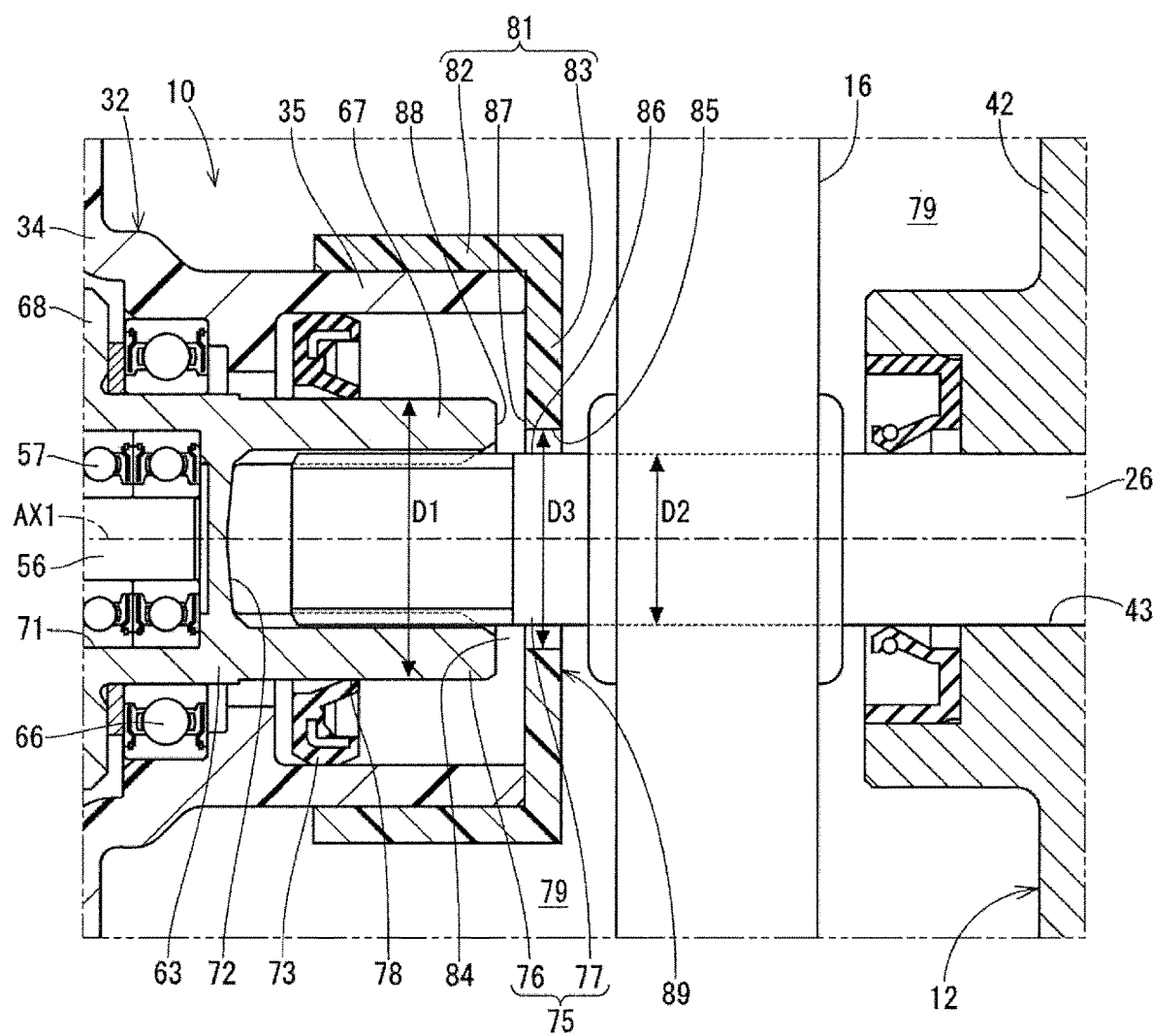
FIG. 4 is a partial enlarged view of a portion IV in FIG. 3.

Next, a structure around the output shaft 63 will be described with reference to FIG. 4. An outer diameter D1 of the shaft portion 67 of the output shaft 63 is larger than an outer diameter D2 of the manual shaft 26. Therefore, a fitting portion, at which the output shaft 63 and the manual shaft 26 are fitted together, forms a stepped shaft portion 75 that is a shaft portion shaped into a stepped form. The stepped shaft portion 75 includes a large diameter portion 76, which is formed by the end portion of the shaft portion 67, and a small diameter portion 77, which is a portion of the manual shaft 26. The output shaft 63 is sealed by the seal member 73 at a sealing point 78 of the output shaft 63, and the stepped shaft portion 75 is located on a side of the sealing point 78 where the outside space 79 of the case 32 is located. The large diameter portion 76 is positioned on a side of the small diameter portion 77 where the sealing point 78 is placed. Specifically, the large diameter portion 76 and the small diameter portion 77 are arranged one after the other in this order form the sealing point 78 side.

A cap 81 is installed to the tubular projecting portion 35 of the case 32. The cap 81 includes: a tubular fitting portion 82, which is fitted to an outer side of the tubular projecting portion 35; and a ring portion 83, which radially inwardly projects from the tubular fitting portion 82 toward the small diameter portion 77. An inner diameter D3 of the ring portion 83 is smaller than the outer diameter D1 of the large diameter portion 76.

With this structure, a labyrinth space 84 is formed in a path that extends from the outside space 79 of the case 32 to the sealing point 78 of the output shaft 63. Specifically, the labyrinth space 84 is formed between an inner wall surface 85 of the ring portion 83 and an outer wall surface 86 of the small diameter portion 77 and also between a side wall surface 87 of the ring portion 83 and an end surface 88 of the large diameter portion 76. The term "labyrinth" means that a start point and an end point cannot be connected by a linear path, and at least one bent portion is present in the labyrinth path. The actuator 10 includes a labyrinth forming portion 89 that forms the labyrinth space 84.

(Advantages)

As discussed above, in the first embodiment, the actuator 10 includes: the seal member 73 that seals between the output shaft 63 (serving as the rotatable body) and the tubular projecting portion 35 of the case 32; and the labyrinth forming portion 89 that forms the labyrinth space 84 in the path that extends from the outside space 79 of the case 32 to the sealing point 78 of the output shaft 63.

By providing the labyrinth space 84 in the path that extends from the outside space 79 to the sealing point 78, application of water to the sealing point 78 and a peripheral area around the sealing point 78 is reduced. Therefore, a gap is less likely formed between the output shaft 63 and the seal member 73 upon elapse of time, and thereby intrusion of the water or the foreign object(s) into the inside of the case 32 can be limited. In this way, it is possible to avoid a trouble(s) that is caused by the intrusion of the water and/or the foreign object(s) particularly to the area of the electric motor 30 at the inside of the case 32.

Now, a comparative example, in which the inhibitor switch is not provided between the actuator and the transmission case, will be discussed. In this comparative example, the case of the actuator is fitted to the transmission case, and a seal member, such as an O-ring, may be provided at a fitting point, at which the case of the actuator is fitted to the transmission case. In this way, a sealing point, which is located between the case and the output shaft or the manual shaft, and a surround area around the sealing point will not be exposed to the outside space.

However, like in the first embodiment where the inhibitor switch 16 is provided between the actuator 10 and the transmission case 42, the sealing point 78 of the output shaft 63 and its peripheral area are unavoidably exposed to the outside space 79. Even in such a case, by providing the labyrinth space 84 in the path that extends from the outside space 79 to the sealing point 78, the application of the water to the sealing point 78 and its peripheral area can be reduced.

Second Embodiment

Figure 5:
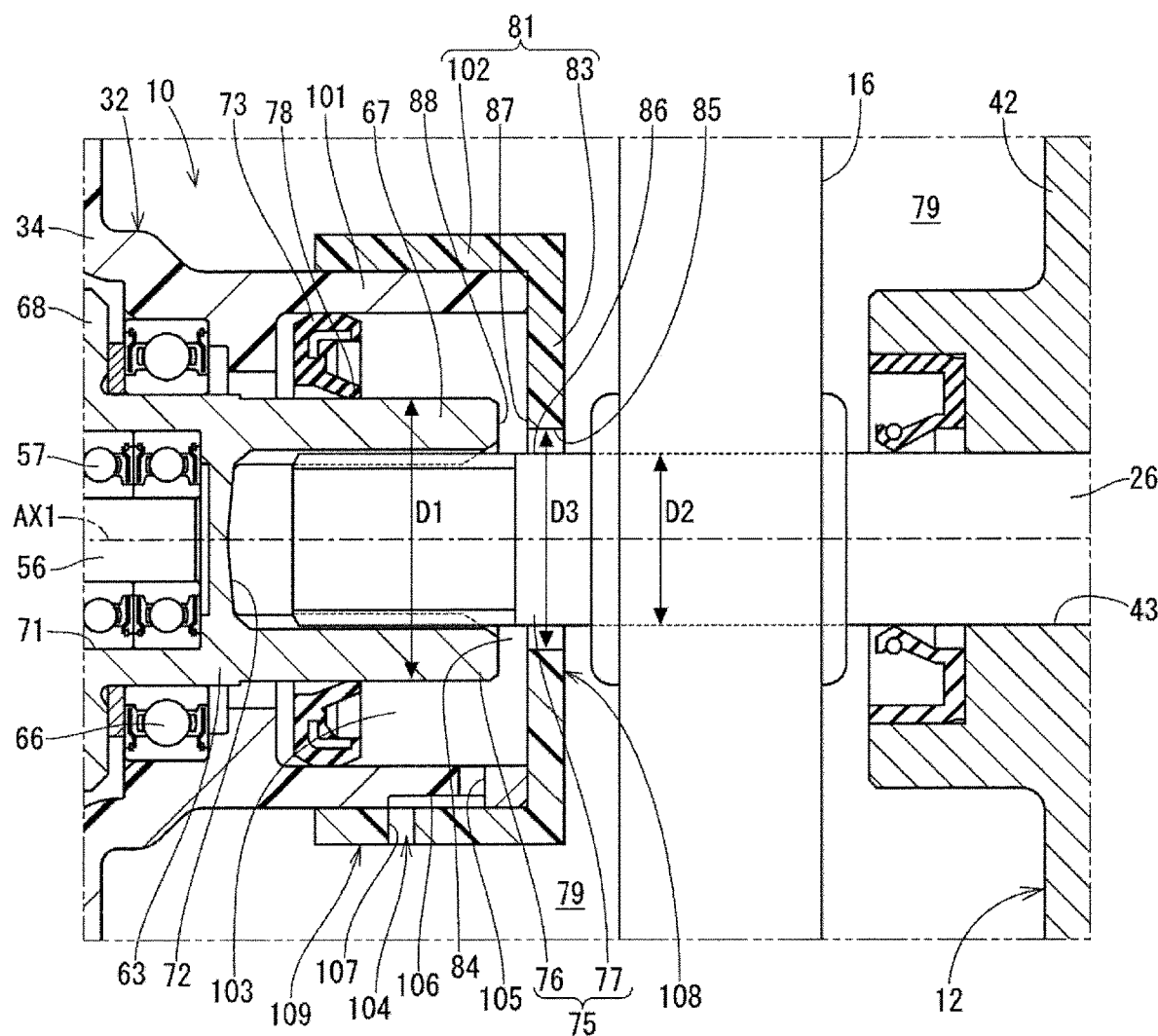
FIG. 5 is an enlarged view showing a peripheral area around an output shaft of a rotary actuator of a second embodiment.

In a second embodiment, as shown in FIG. 5, a tubular projecting portion 101 of the case 32 and a tubular fitting portion 102 of the cap 81 form a drain passage 104. The drain passage 104 is a space in an inside of the tubular projecting portion 101 and communicates a space 103, which is located between the sealing point 78 and the labyrinth space 84, to the outside space 79. The drain passage 104 includes: an inner drain hole 105 of the tubular projecting portion 101; and a drain groove 106 and an outer drain hole 107 of the tubular fitting portion 102. The inner drain hole 105 is a through hole that extends through the tubular projecting portion 101 between an inside and an outside of the tubular projecting portion 101. The outer drain hole 107 is a through hole that extends through the tubular fitting portion 102 between an inside and an outside of the tubular fitting portion 102. The drain groove 106 is formed at an outer wall of the tubular projecting portion 101 and communicates between the inner drain hole 105 and the outer drain hole 107. In the second embodiment, the number of the inner drain hole 105 is one, and the number of the outer drain hole 107 is one. Furthermore, an axial position of the outer drain hole 107 is displaced from an axial position of the inner drain hole 105.

With the above structure, the drain passage 104 becomes a passage in a labyrinth form. A tubular portion 109, which includes the tubular projecting portion 101 and the tubular fitting portion 102, forms the labyrinth forming portion 108 and includes the drain passage 104 that communicates between the space 103 and the outside space 79. The tubular projecting portion 101 serves as the small diameter tube, and the tubular fitting portion 102 serves as the large diameter tube.

(Advantages)

In the first embodiment, it is difficult for the water or the like to enter from the outside space 79 into the inside space of the tubular projecting portion 101 due to the provision of the labyrinth space 84. However, once the water or the like enters into the inside space of the tubular projecting portion 101, it stays in the inside space of the tubular projecting portion 101.

With respect to this point, in the second embodiment, the labyrinth forming portion 108 includes the tubular portion 109 that is placed on the outside space 79 side of the sealing point 78 and on the radially outer side of the output shaft 63. The tubular portion 109 includes the drain passage 104 that communicates the space 103, which is located between the sealing point 78 and the labyrinth space 84, to the outside space 79.

Thereby, the water or the like, which has entered into the space 103, is drained to the outside space 79 through the drain passage 104. Therefore, the application of the water to the sealing point 78 and its surrounding area can be further reduced.

Furthermore, in the second embodiment, the drain passage 104 is the passage in the labyrinth form. Therefore, it is difficult for the water or the like to enter into the space 103 from the outside space 79 side through the drain passage 104.

Furthermore, in the second embodiment, the tubular portion 109 includes the tubular projecting portion 101 and the tubular fitting portion 102 while the tubular fitting portion 102 is fitted to the outer side of the tubular projecting portion 101. The drain passage 104 includes: the inner drain hole 105 that extends through the tubular projecting portion 101 between the inside and the outside of the tubular projecting portion 101; the outer drain hole 107 that extends through the tubular fitting portion 102 between the inside and the outside of the tubular fitting portion 102; and the drain groove 106 that is formed at the outer wall of the tubular projecting portion 101 and communicates between the inner drain hole 105 and the outer drain hole 107. The axial position of the outer drain hole 107 is displaced from the axial position of the inner drain hole 105. With this construction, the drain passage 104 can be formed as the passage in the labyrinth form.

Third Embodiment

Figure 6:
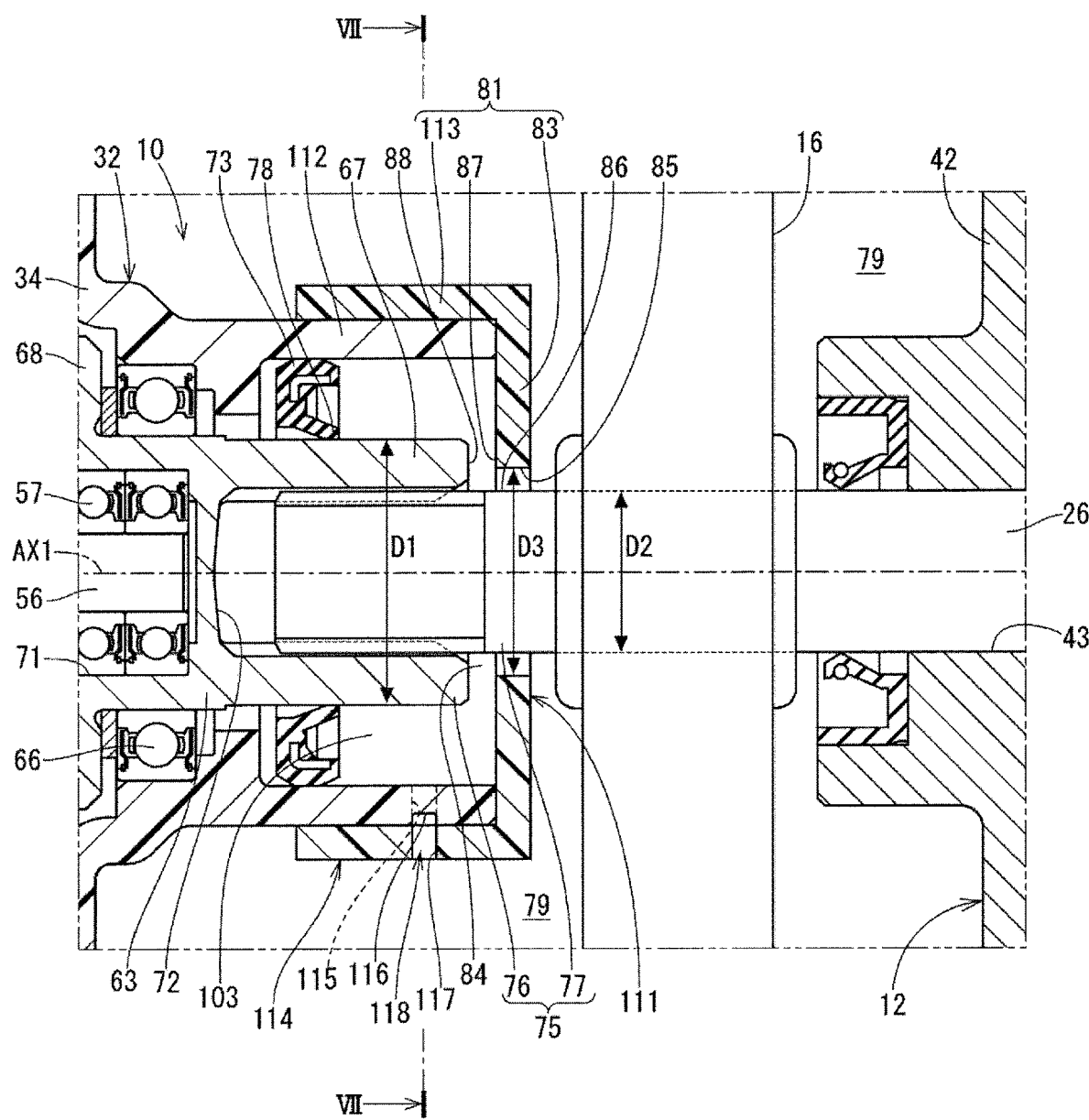
FIG. 6 is an enlarged view showing a peripheral area around an output shaft of a rotary actuator of a third embodiment.
Figure 7:
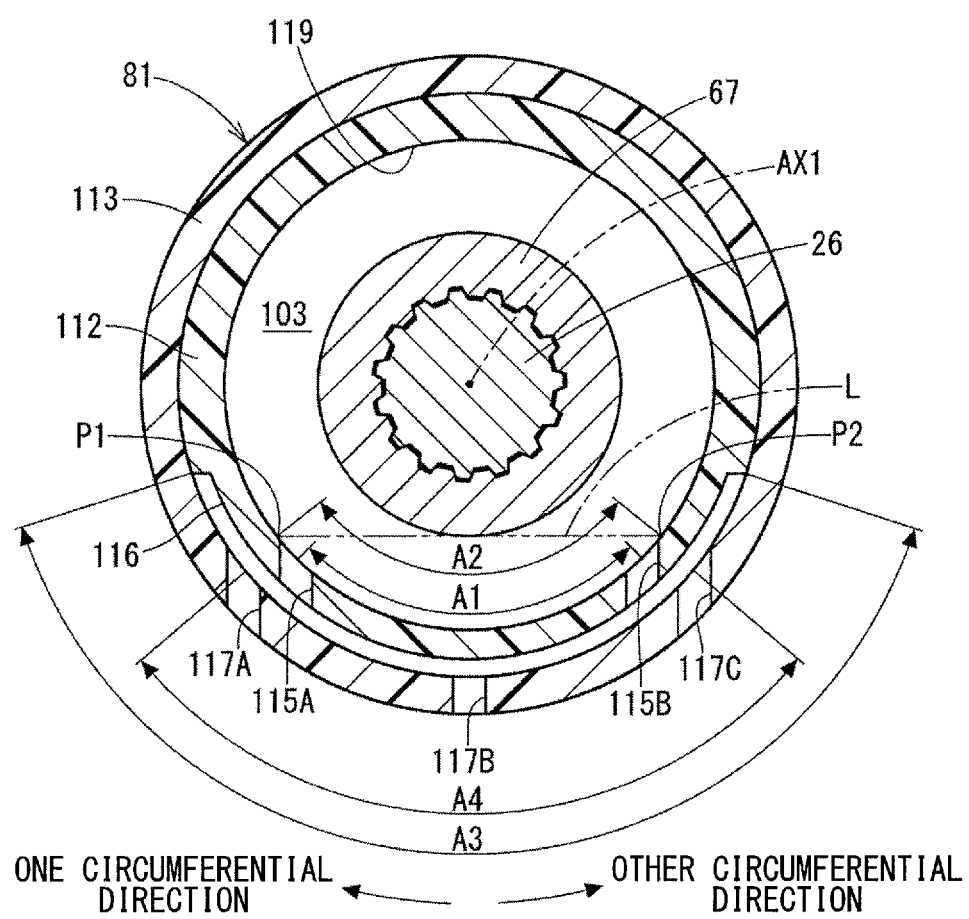
FIG. 7 is a cross sectional view taken along line VII-VII in FIG. 6.

In a third embodiment, as shown in FIGS. 6 and 7, a labyrinth forming portion 111 includes a tubular portion 114 that has a tubular projecting portion 112 and a tubular fitting portion 113. The tubular portion 114 includes a drain passage 118 that has a plurality of inner drain holes 115, a drain groove 116 and a plurality of outer drain holes 117. The inner drain holes 115 are respectively formed at two locations, which are circumferentially spaced from each other. The outer drain holes 117 are respectively formed at three locations, which are circumferentially spaced from each other. The drain groove 116 is formed at the tubular projecting portion 112 and extends in the circumferential direction.

Hereinafter, when the inner drain holes 115 need to be distinguished from one another, the inner drain holes 115 will be indicated as an inner drain hole 115A and a inner drain hole 115B, respectively. Also, when the outer drain holes 117 need to be distinguished from one another, the outer drain holes 117 will be indicated as an outer drain hole 117A, an outer drain hole 1176 and an outer drain hole 117C, respectively.

In a transverse cross section (i.e., FIG. 7) of the tubular projecting portion 112, which includes the inner drain holes 115, a straight line, which is imaginary and externally touches the shaft portion 67 of the output shaft 63, is defined as an imaginary straight line L, and the imaginary straight line L intersects with an inner wall surface 119 of the tubular projecting portion 112 at one intersection point and another intersection point, which are defined as a first intersection point P1 and a second intersection point P2, respectively. A circumferential distance A1 between the two inner drain holes 115, which are circumferentially arranged one after the other, is smaller than a circumferential distance A2 between the first intersection point P1 and the second intersection point P2.

Here, in an axial view (i.e., FIG. 7) taken from the output shaft 63 side toward the manual shaft 26 side, a clockwise direction will be referred to as one circumferential direction, and a counterclockwise direction will be referred to as the other circumferential direction. At this time, the outer drain holes 117, the inner drain holes 115 and the drain groove 116 have the following positional relationships.

(First Positional Relationship) One 117A of the outer drain holes 117, which is furthermost toward one side in the one circumferential direction among the outer drain holes 117, is displaced in the one circumferential direction away from one 115A of the inner drain holes 115, which is furthermost toward the one side in the one circumferential direction among the inner drain holes 115.

(Second Positional Relationship) Another one 117C of the outer drain holes 117, which is furthermost toward the other side in the other circumferential direction among the outer drain holes 117, is displaced in the other circumferential direction away from another one 115B of the inner drain holes 115, which is furthermost toward the other side in the other circumferential direction among the inner drain holes 115.

(Third Positional Relationship) The drain groove 116 extends toward the one side in the one circumferential direction further away from the one 115A of the inner drain holes 115, which is furthermost toward the one side in the one circumferential direction among the inner drain holes 115. The drain groove 116 extends toward the other side in the other circumferential direction further away from the other one 115B of the inner drain holes 115, which is furthermost toward the other side in the other circumferential direction among the inner drain holes 115.

(Fourth positional relationship) A circumferential length A3 of the drain groove 116 is larger than a circumferential distance A4 between: the one 117A of the outer drain holes 117, which is furthermost toward the one side in the one circumferential direction among the outer drain holes 117; and the other one 117C of the outer drain holes 117, which is furthermost toward the other side in the other circumferential direction among the two outer drain holes 117.

(Advantages)

Figure 8:
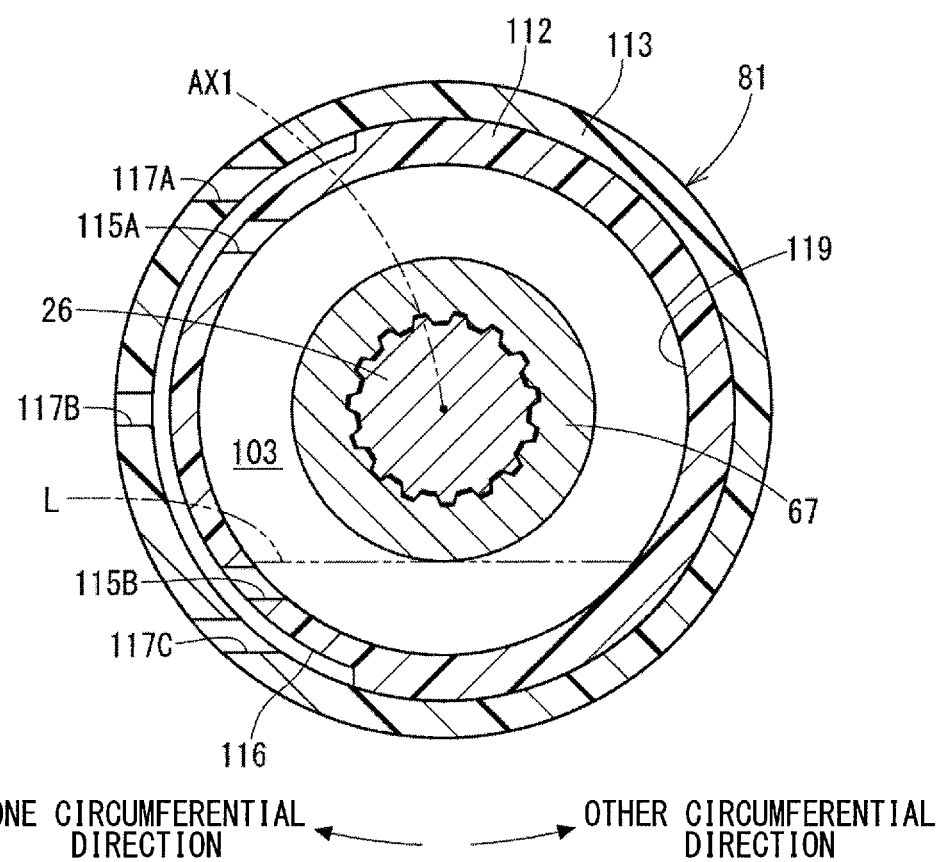
FIG. 8 is a diagram showing a state where a mount angle on the vehicle is deviated about 90 degrees in one circumferential direction from a basic mount state on the vehicle shown in FIG. 7.
Figure 9:
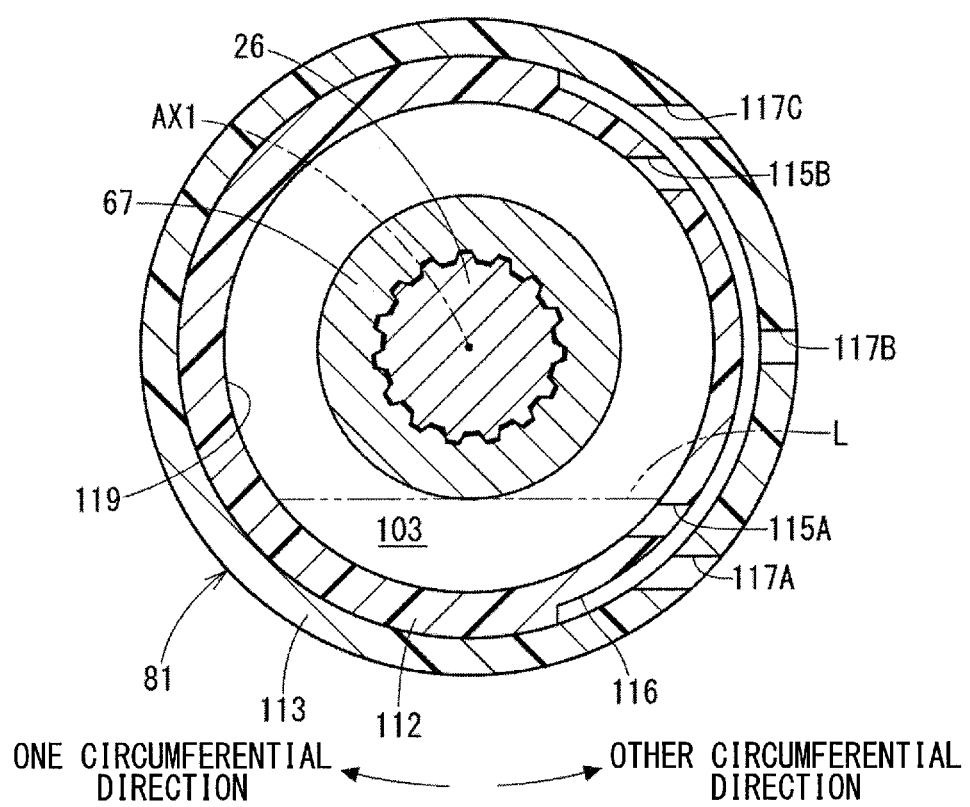
FIG. 9 is a diagram showing a state where the mount angle on the vehicle is deviated about 90 degrees in the other circumferential direction from the basic mount state on the vehicle shown in FIG. 7.

As discussed above, in the third embodiment, the inner drain holes 115 are respectively formed at the two or more locations, which are circumferentially spaced from each other. Therefore, even if the mount state of the actuator 10 on the vehicle is deviated to some extent as shown in FIGS. 7 to 9, at least one of the inner drain holes 115 is located on the lower side of the shaft portion 67 of the output shaft 63 in the vertical direction. A permissible angle at this time is larger than that of a case where only one inner drain hole 115 is provided. Therefore, the state, in which the sealing point 78 and its peripheral area is not immersed in the water or the like area, can be maintained as much as possible. In the present embodiment, the state of avoiding the application of the water can be maintained even when the actuator 10 is rotated by 180 degrees from the state shown in FIG. 8 to the state shown in FIG. 9, and thereby the permissible angle discussed above is equal to or lager than 180 degrees.

Furthermore, in the third embodiment, the circumferential distance A1 between the two inner drain holes 115, which are arranged one after the other in the circumferential direction, is smaller than the circumferential distance A2 between the first intersection point P1 and the second intersection point P2. Thereby, the state of avoiding the application of the water can be continuously maintained regardless of the mount angle on the vehicle. Specifically, even when the mount angle on the vehicle is deviated, at least one of the inner drain holes 115 is located on the lower side of the shaft portion 67 of the output shaft 63 in the vertical direction.

Furthermore, in the third embodiment, the first positional relationship and the second positional relationship are satisfied. In this way, even when the mount angle on the vehicle is deviated from the basic mount state on the vehicle shown in FIG. 7 to another mount angle on the vehicle shown in FIG. 8 or FIG. 9, the water or the like can be smoothly drained through the drain passage 118.

Furthermore, in the third embodiment, the third positional relationship is satisfied. In this way, even when the mount angle on the vehicle is deviated from the basic mount state on the vehicle shown in FIG. 7 to another mount angle on the vehicle shown in FIG. 8 or FIG. 9, the water or the like can be smoothly drained through the drain passage 118.

Figure 10:
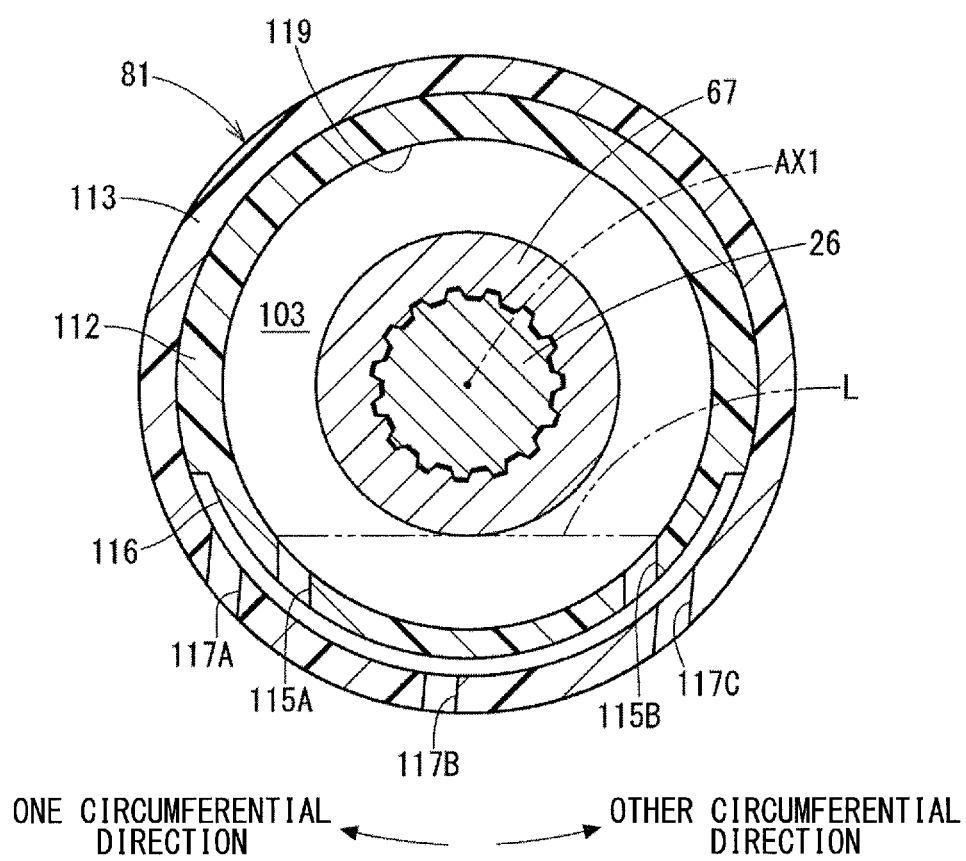
FIG. 10 is a diagram showing a state where an installation angle of a cap relative to a case is deviated in the one circumferential direction from a basic installation state shown in FIG. 7.
Figure 11:
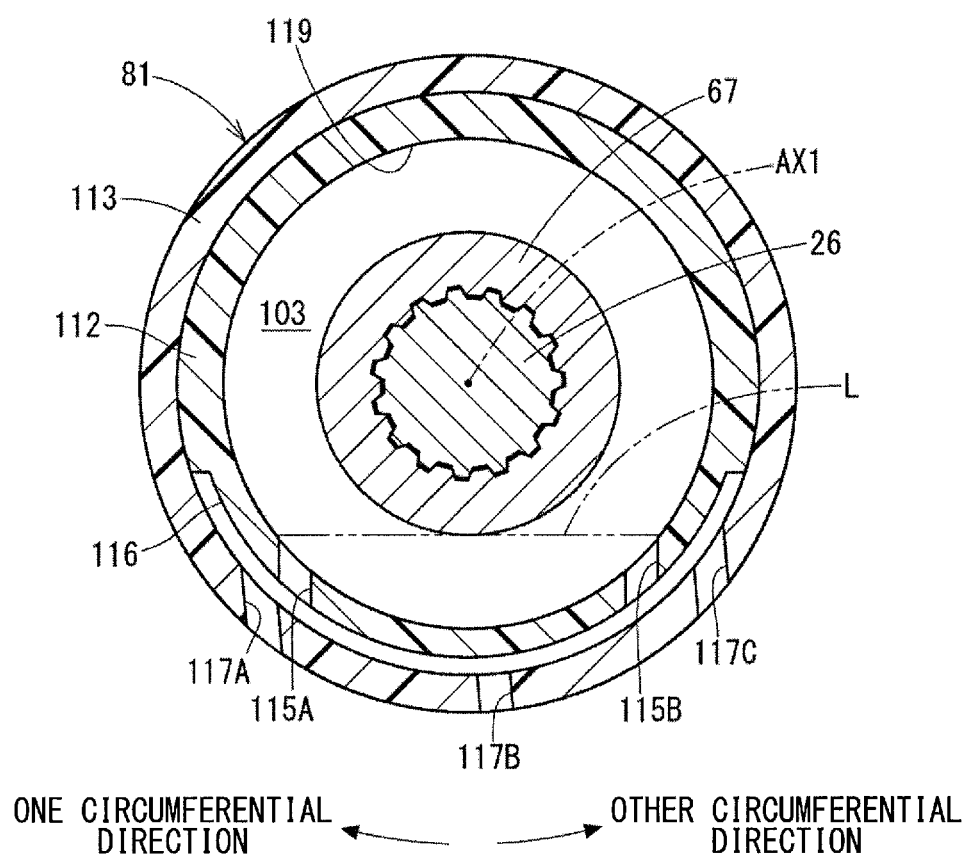
FIG. 11 is a diagram showing a state where the installation angle of the cap relative to the case is deviated in the other circumferential direction from the basic installation state shown in FIG. 7.

Furthermore, in the third embodiment, the drain groove 116 is formed at the tubular projecting portion 112. Also, the fourth positional relationship is satisfied. In this way, even when the installation of the cap 81 to the case 32 is deviated, i.e., even when the relative rotational position between the tubular fitting portion 113 and the tubular projecting portion 112 is deviated from the basic installation state shown in FIG. 7 to the installation state shown in FIG. 10 or FIG. 11, the inner drain hole(s) 115 and the outer drain hole(s) 117 can be connected relative to each other through the drain groove 116.

Fourth Embodiment

Figure 12:
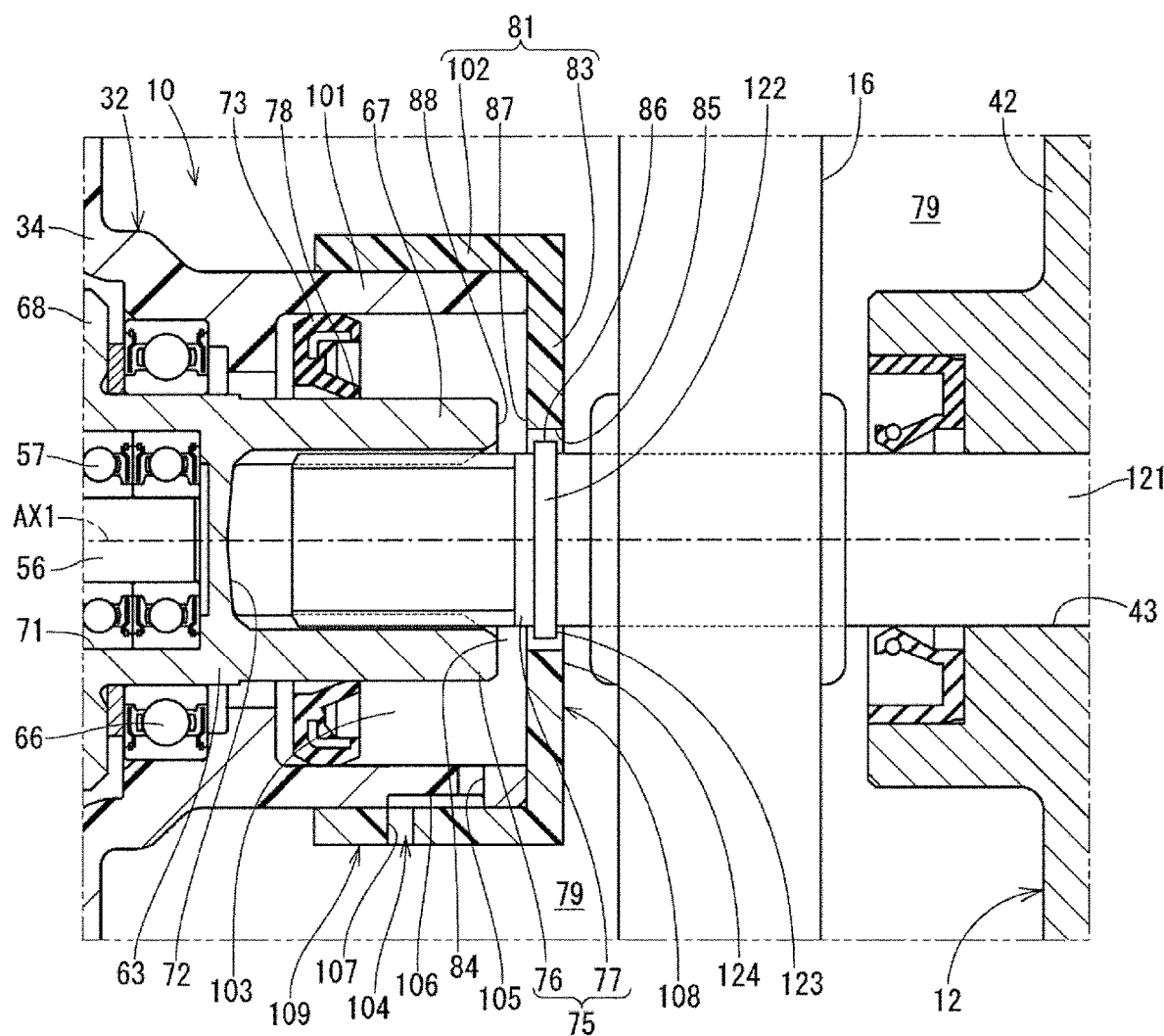
FIG. 12 is an enlarged view showing a peripheral area around an output shaft of a rotary actuator of a fourth embodiment.

In a fourth embodiment, as shown in FIG. 12, a manual shaft 121 includes a flange 122 that is placed on the radially inner side of the ring portion 83. A side wall 123 of the flange 122, which is opposite from the sealing point 78, is located on the sealing point 78 side of a side wall 124 of the ring portion 83, which is opposite from the sealing point 78. The output shaft 63 serves as a first shaft, and the manual shaft 121 serves as a second shaft.
(Advantages)

By providing the flange 122 in the above described manner, the water or the like, which flows along the manual shaft 121 toward the labyrinth space 84, is blocked by the flange 122. Therefore, it is difficult for the water or the like to enter from the outside space 79 side into the space 103 through the labyrinth space 84, and thereby the application of the water to the sealing point 78 and its peripheral area can be further reduced.

Fifth Embodiment

Figure 13:
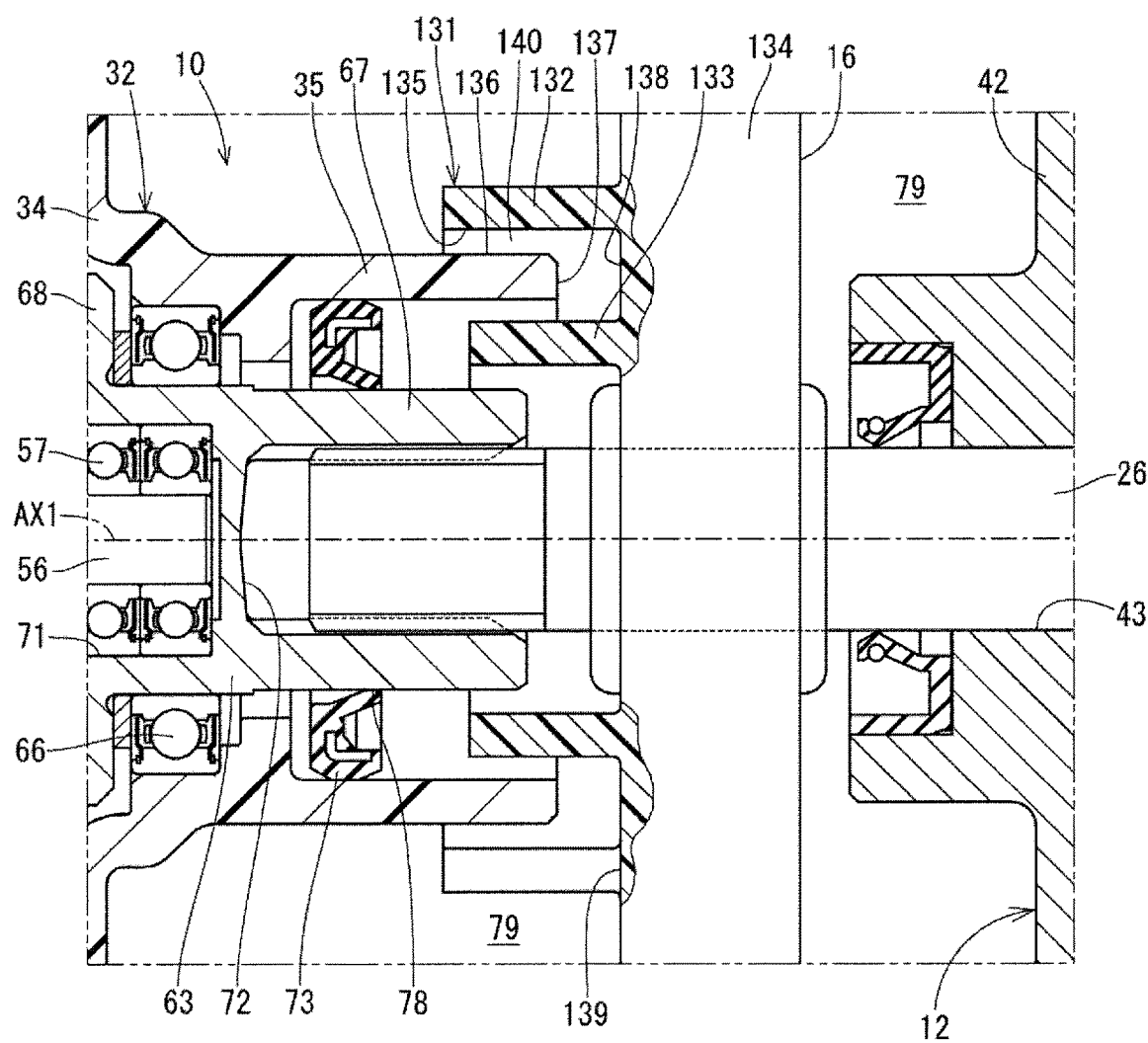
FIG. 13 is an enlarged view showing a peripheral area around an output shaft of a rotary actuator of a fifth embodiment.

In a fifth embodiment, as shown in FIG. 13, a labyrinth forming portion 131 includes the tubular projecting portion 35, a first annular projection 132 and a second annular projection 133. The first annular projection 132 is located on a radially outer side of the tubular projecting portion 35 and projects from a switch case 134 of the inhibitor switch 16 toward the case 32 while an axial extent of the first annular projection 132 overlaps with an axial extent of the tubular projecting portion 35. The second annular projection 133 is located on a radially inner side of the tubular projecting portion 35 and projects from the switch case 134 toward the case 32 while an axial extent of the second annular projection 133 overlaps with an axial extent of the tubular projecting portion 35.

A labyrinth space 140 is formed between an inner wall surface 135 of the first annular projection 132 and an outer wall surface 136 of the tubular projecting portion 35 and also between a distal end surface 137 of the tubular projecting portion 35 and a side wall surface 138 of the switch case 134. A lower side of the first annular projection 132, which is placed at the lower side in the vertical direction in a state where the rotary actuator is installed to the vehicle, has a cutout 139. The switch case 134 serves as a support member.
(Advantages)

Figure 14:
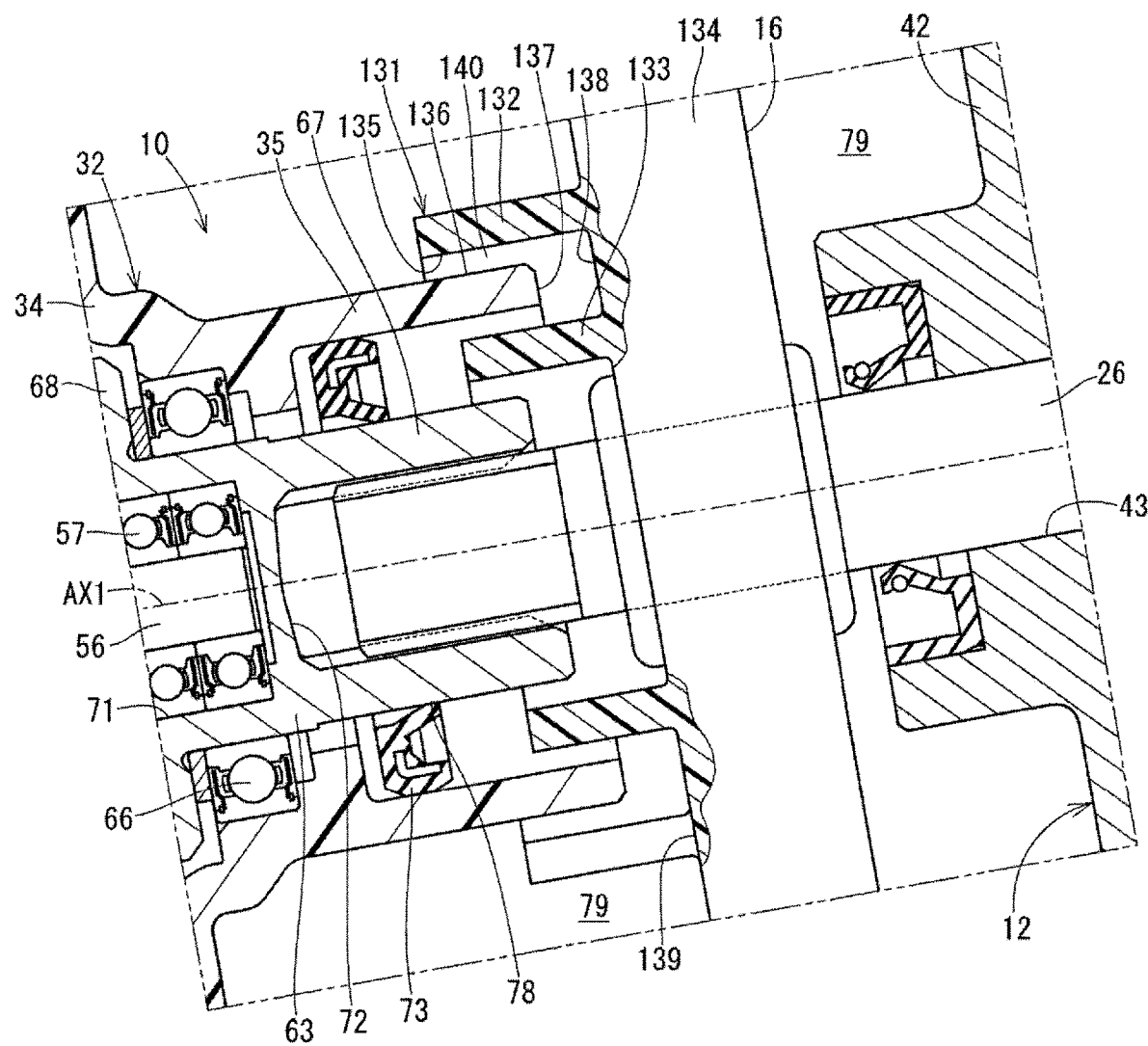
FIG. 14 is a diagram showing a state where the vehicle is tilted toward one side from the basic mount state on the vehicle shown in FIG. 13.
Figure 15:
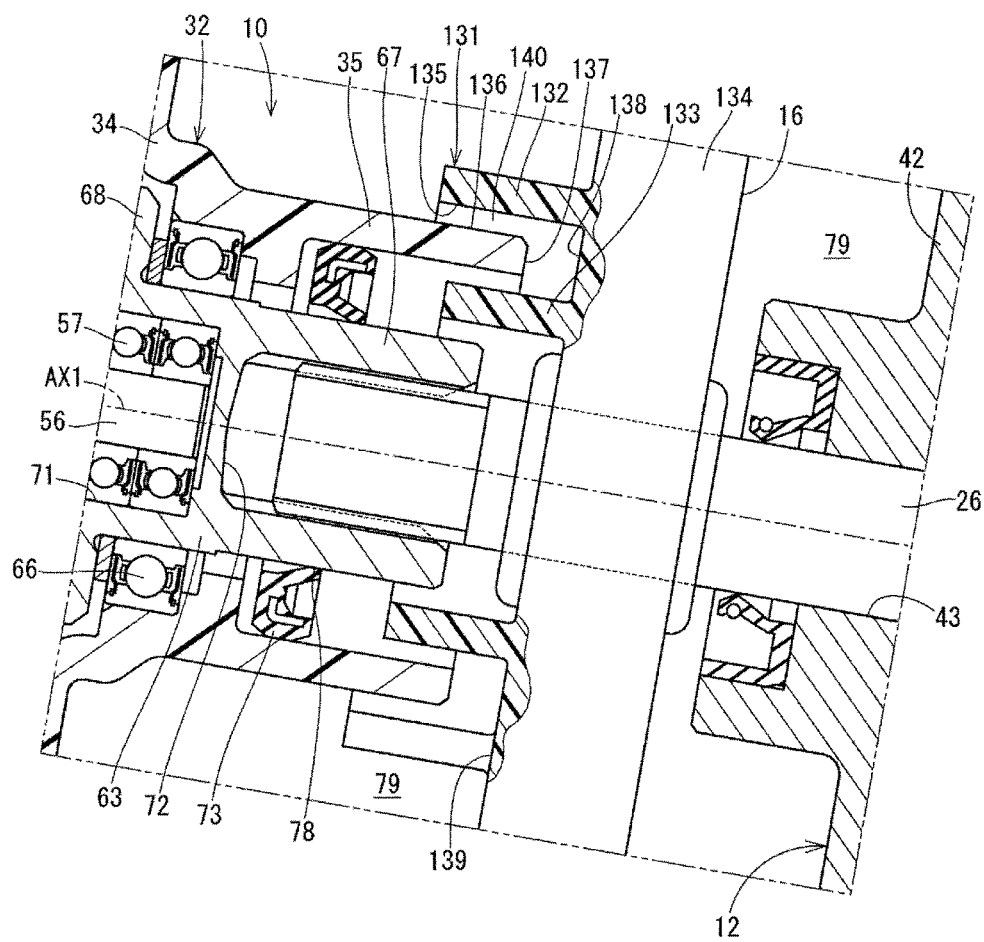
FIG. 15 is a diagram showing a state where the vehicle is tilted toward the other side from the basic mount state on the vehicle shown in FIG. 13.

As discussed above, in the path, which extends from the outside space 79 to the sealing point 78, the labyrinth space 140 is placed between the case 32 and the switch case 134. Thereby, application of the water to the sealing point 78 and its peripheral area is reduced. For example, in a case where the vehicle is tilted in a manner shown in FIG. 14, the water or the like falls downward along an outer wall surface of the first annular projection 132. Also, in a case where the vehicle is tilted in a manner shown in FIG. 15, even when the water or the like flows along an outer wall surface of the tubular projecting portion 35 and intrudes into the labyrinth space 140, the water or the like flows downward along the outer wall surface of the second annular projection 133 and falls downward through the cutout 139.

Other Embodiments

Figure 16:
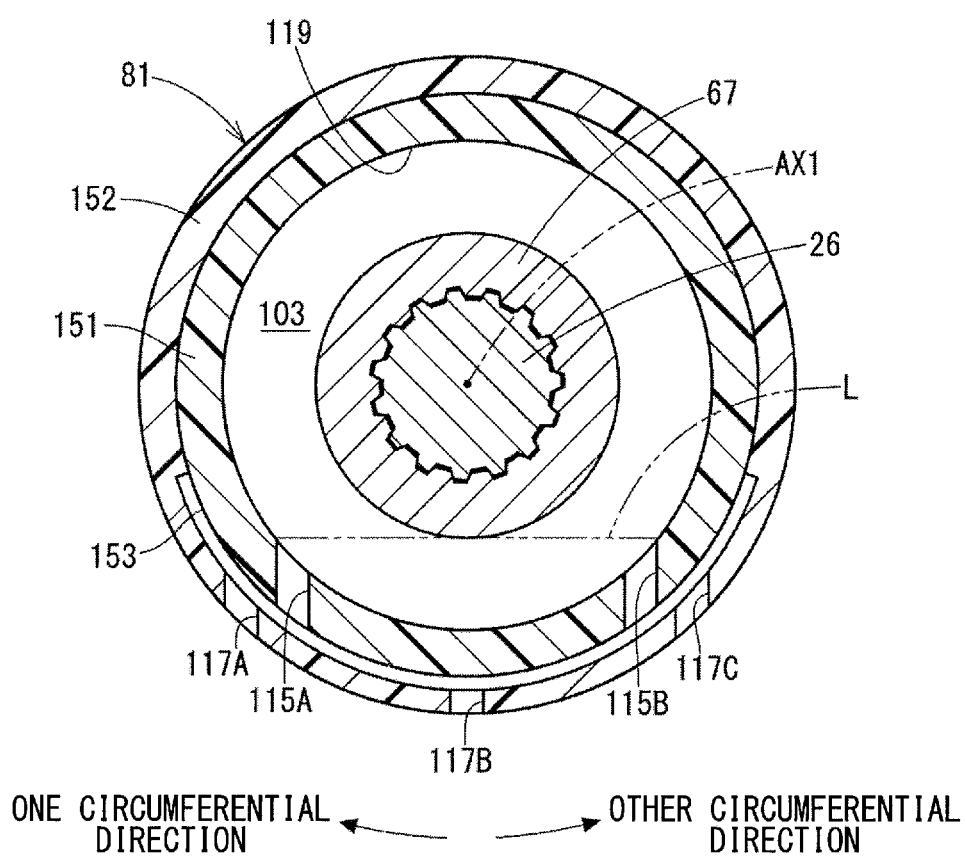
FIG. 16 is a transverse cross sectional view of an output shaft of a rotary actuator of another embodiment.

In another embodiment, as shown in FIG. 16, the drain groove is not formed at a tubular projecting portion 151, and a drain groove 153 may be formed at an inner wall of a tubular fitting portion 152.

In another embodiment, the stepped shaft portion may be formed only by the output shaft or only by the manual shaft. Furthermore, the stepped shaft portion may be formed by a projection in a flange form.

In another embodiment, an outer diameter of the shaft portion of the output shaft may be smaller than an outer diameter of the manual shaft. In another embodiment, a seal member may be placed between the case and the manual shaft.

In another embodiment, the tubular fitting portion of the cap may be fitted to an inner side of the tubular projecting portion of the case. Furthermore, the cap may be formed only by the ring portion and may be fixed to the end portion of the tubular projecting portion of the case.

In another embodiment, the inner drain holes may be arranged at equal intervals or unequal intervals along an entire circumferential extent of the tubular projecting portion, and the drain groove may extend along the entire circumferential extent.

In the fifth embodiment, the first annular projection 132 and the second annular projection 133 are provided, and the cutout 139 is formed at the first annular projection 132. Alternatively, in another embodiment, one or both of the second annular projection and the cutout may be eliminated.

The present disclosure is not necessarily limited to the above embodiments and may be implemented in various forms without departing from the principle of the present disclosure.

The present disclosure has been described in view of the various embodiments. However, the present disclosure should not be limited to the above embodiments and the structures described therein. The present disclosure covers various modifications and equivalents thereof. Also, various combinations and forms, as well as other combinations and forms including one element only, one or more, or even less, among them, fall within the scope and spirit of the present disclosure.

The invention claimed is:

1. A rotary actuator as a drive device of a shift-by-wire system for a vehicle, comprising:
   an electric motor;
   a case that receives the electric motor;
   a rotatable body that is configured to transmit an output of the electric motor to an outside of the case;
   a seal member that seals between the rotatable body and the case; and
   a labyrinth forming portion that forms a labyrinth space in a path that extends from an outside space of the case to a sealing point of the rotatable body, at which the rotatable body is sealed by the seal member, wherein:
   the rotatable body has a stepped shaft portion that includes a large diameter portion and a small diameter portion, wherein the large diameter portion and the small diameter portion are located on a side of the sealing point where the outside space is located;
   the large diameter portion is positioned on a side of the small diameter portion where the sealing point is placed;

the labyrinth forming portion includes a ring portion that is placed on a radially outer side of the small diameter portion;

an inner diameter of the ring portion is smaller than an outer diameter of the large diameter portion; and the labyrinth space is located between an inner wall surface of the ring portion and an outer wall surface of the small diameter portion and also between a side wall surface of the ring portion and an end surface of the large diameter portion.

2. The rotary actuator according to claim 1, wherein:

the rotatable body includes:

a first shaft that has the sealing point; and a second shaft that is coupled to the first shaft in a manner that enables transmission of rotation between the first shaft and the second shaft;

the second shaft includes a flange that is placed on a radially inner side of the ring portion; and a side wall of the flange, which is opposite from the sealing point, is located on the sealing point side of a side wall of the ring portion that is opposite from the sealing point.

3. The rotary actuator according to claim 1, wherein:

the labyrinth forming portion includes a tubular portion that is placed on the outside space side of the sealing point and is on a radially outer side of the rotatable body; and the tubular portion includes a drain passage, wherein the drain passage is a space in an inside of the tubular portion and communicates a space, which is located between the sealing point and the labyrinth space, to the outside space.

4. The rotary actuator according to claim 3, wherein the drain passage is a passage in a form of a labyrinth.

5. The rotary actuator according to claim 4, wherein:

the tubular portion includes a small diameter tube and a large diameter tube while the large diameter tube is fitted to an outer side of the small diameter tube;

the drain passage includes:

an inner drain hole that extends through the small diameter tube from an inside to an outside of the small diameter tube;

an outer drain hole that extends through the large diameter tube from an inside to an outside of the large diameter tube; and a drain groove that is formed at an outer wall of the small diameter tube or an inner wall of the large diameter tube, wherein the drain groove communicates between the inner drain hole and the outer drain hole; and one or both of a circumferential position and an axial position of the outer drain hole are displaced relative to the inner drain hole.

6. The rotary actuator according to claim 5, wherein the inner drain hole is one of at least two inner drain holes that are circumferentially spaced from each other.

7. The rotary actuator according to claim 6, wherein:

in a transverse cross section of the small diameter tube, which includes the at least two inner drain holes, an imaginary straight line is defined as an imaginary straight line that externally touches the rotatable body, and one intersection point and another intersection point of the imaginary straight line, which intersect an inner wall surface of the small diameter tube, are defined as a first intersection point and a second intersection point, respectively; and a circumferential distance between the at least two inner drain holes, which are circumferentially arranged one after another, is smaller than a circumferential distance between the first intersection point and the second intersection point.

8. The rotary actuator according to claim 6, wherein:

the outer drain hole is one of at least two outer drain holes that are circumferentially spaced from each other;

one of the at least two outer drain holes, which is furthermost toward one side in one circumferential direction among the at least two outer drain holes, is displaced in the one circumferential direction away from one of the at least two inner drain holes, which is furthermost toward the one side in the one circumferential direction among the at least two inner drain holes; and another one of the at least two outer drain holes, which is furthermost toward another side in another circumferential direction among the at least two outer drain holes, is displaced in the another circumferential direction away from another one of the at least two inner drain holes, which is furthermost toward the another side in the another circumferential direction among the at last two inner drain holes.

9. The rotary actuator according to claim 6, wherein:

the drain groove extends toward one side in one circumferential direction further away from one of the at least two inner drain holes, which is furthermost toward the one side in the one circumferential direction among the at least two inner drain holes; and the drain groove extends toward another side in another circumferential direction further away from another one of the at least two inner drain holes, which is furthermost toward the another side in the another circumferential direction among the at last two inner drain holes.

10. The rotary actuator according to claim 5, wherein:

the drain groove is formed at the small diameter tube;

the outer drain hole is one of at least two outer drain holes that are circumferentially spaced from each other; and a circumferential length of the drain groove is larger than a circumferential distance between:

one of the at least two outer drain holes, which is furthermost toward one side in one circumferential direction among the at least two outer drain holes; and another one of the at least two outer drain holes, which is furthermost toward another side in another circumferential direction among the at least two outer drain holes.

11. The rotary actuator according to claim 5, wherein:

the drain groove is formed at the large diameter tube;

the outer drain hole is one of at least two outer drain holes that are circumferentially spaced from each other; and a circumferential length of the drain groove is larger than a circumferential distance between:

one of the at least two outer drain holes, which is furthermost toward one side in one circumferential direction among the at least two outer drain holes; and another one of the at least two outer drain holes, which is furthermost toward another side in another circumferential direction among the at least two outer drain holes.

* * * * *